H. L. EVANS AND J. W. ANDREWS.
ARTICLE FEEDING AND COLLATING MECHANISM.
APPLICATION FILED APR. 7, 1921.
1,437,409.
Patented Dec. 5, 1922.
3 SHEETS—SHEET 1.
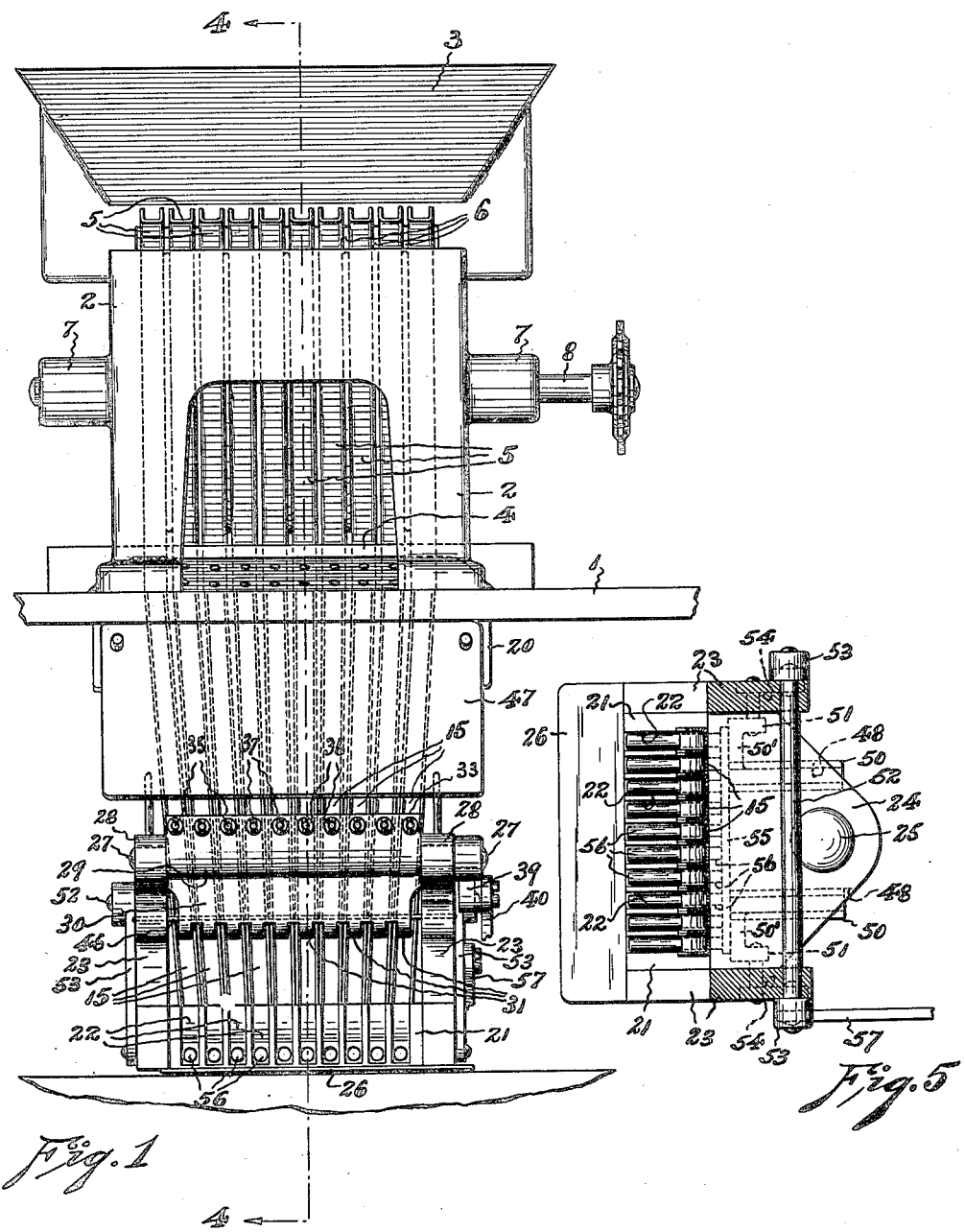
INVENTORS:
Harry L. Evans & Jesse Watson Andrews,
BY
Fraentzel & Richards
ATTORNEYS

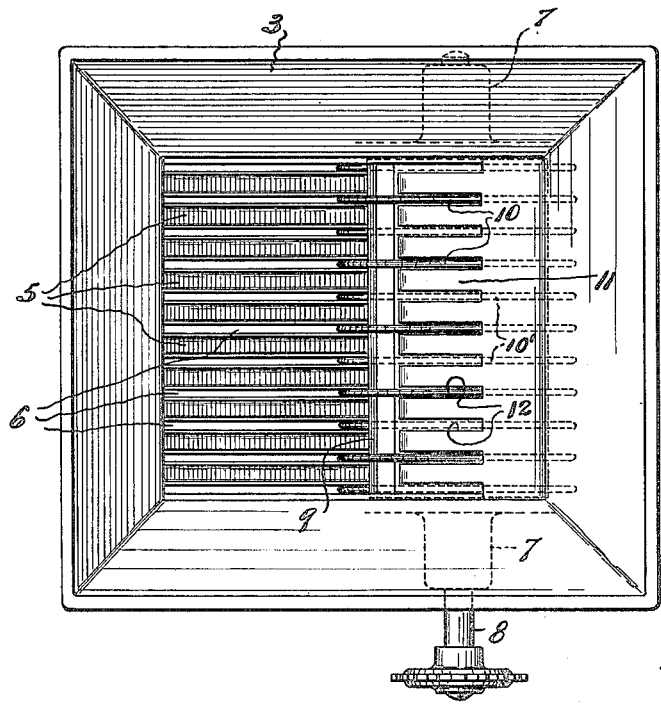
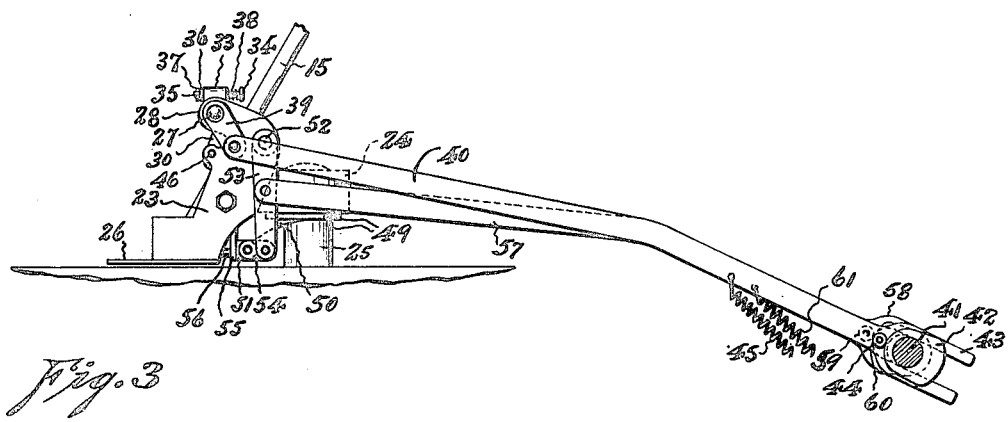

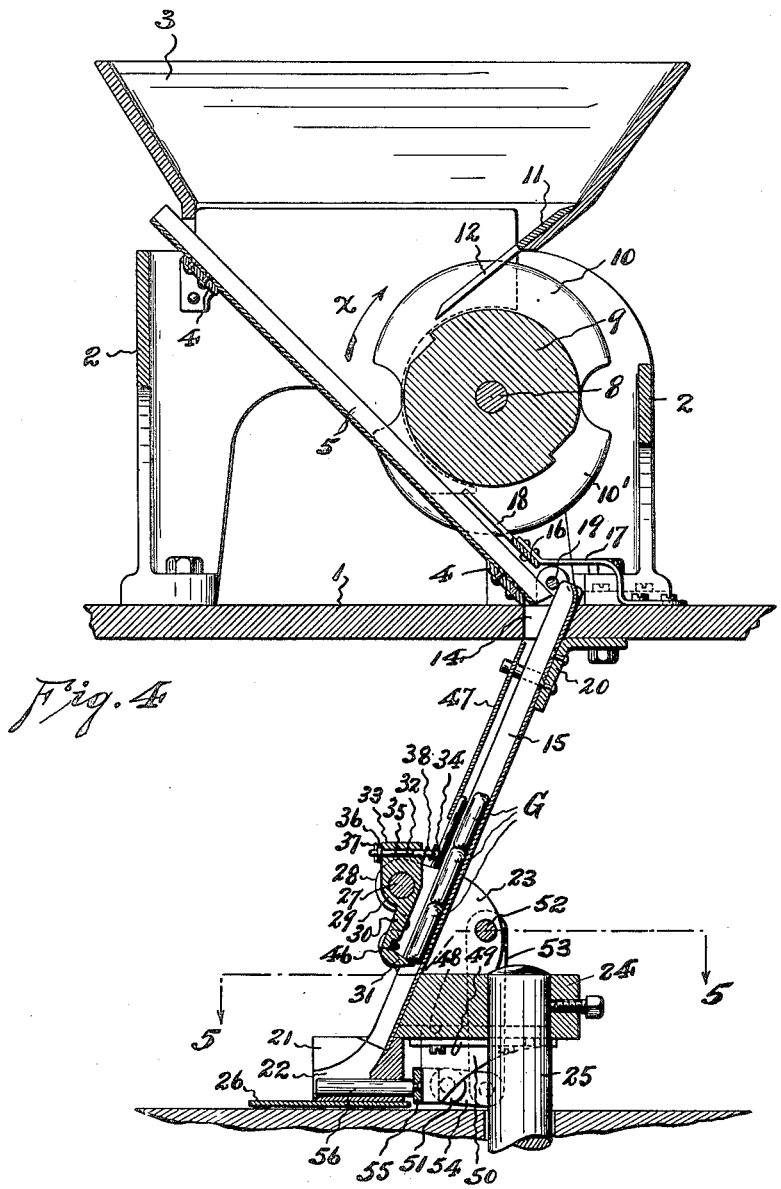

Patented Dec. 5, 1922.

1,437,409

UNITED STATES PATENT OFFICE.

HARRY L. EVANS AND JESSE WATSON ANDREWS, OF NEWPORT, RHODE ISLAND, ASSIGNORS TO CARTONING MACHINERY CORPORATION, OF NEWARK, NEW JERSEY, A CORPORATION OF NEW JERSEY.

ARTICLE FEEDING AND COLLATING MECHANISM.

Application filed April 7, 1921. Serial No. 459,387.

*To all whom it may concern:*

Be it known that we, HARRY L. EVANS and JESSE WATSON ANDREWS, citizens of the United States, residing at Newport, in the county of Newport and State of Rhode Island, have invented certain new and useful Improvements in Article Feeding and Collating Mechanism; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to an improved means for feeding and collating articles or goods of various kinds, and delivering the same in predetermined numbers for various purposes, such, for example, as delivering the same subject to the operation of carton or package filling mechanism.

The present invention has for its principal object to provide a novel automatic article feeding and collating mechanism comprising a hopper provided with a plurality of article chutes, agitator means for inducing the proper entry of said articles into said chutes, together with means for controlling the release of articles from the discharge ends of said chutes to assure the delivery of the same in groups of a desired predetermined number thereof.

Other objects of the present invention, not at this time more particularly enumerated, will be clearly understood from the following detailed description of the same.

With the various objects of the invention in view, the same consists, primarily, in the novel article feeding and collating mechanism hereinafter set forth; and, the invention consists, furthermore, in the novel arrangements and combinations of the various devices and parts, as well as in the details of the construction of the same, all of which will be hereinafter more fully described, and then finally embodied in the claims appended hereto.

The invention is clearly illustrated in the accompanying drawings, in which:—

Figure 1 is a front elevation of the novel article feeding and collating mechanism made according to and embodying the principles of the present invention; Figure 2 is a top or plan view of the same; Figure 3 is a detail side view of the discharge end of the feeding and collating mechanism, drawn on a reduced scale, and illustrating the means controlling the release and delivery of articles from the chutes, together with the actuating mechanism therefor; Figure 4 is a vertical longitudinal section, taken on line 4—4 in said Figure 1; and Figure 5 is a detail horizontal section, taken on line 5—5 in said Figure 4.

Similar characters of reference are employed in all of the hereinabove described views, to indicate corresponding parts.

Referring now to the drawings, the reference character 1 indicates a hopper supporting platform or other means suitably elevated above the desired point of delivery at which the articles handled are to be discharged. Secured upon said platform 1 is a frame-work 2 upon which is mounted a hopper body 3. Connected with said frame-work 2 and said platform 1, by means of suitable transverse supporting brackets 4, are a plurality of obliquely disposed receiving chutes 5, which extend downwardly across the lower or open bottom portion of said hopper body 3. Said chutes are of an internal width adapted to receive the article to be handled, and said receiving chutes are further slightly spaced apart to provide between the same intermediate spaces 6. Said chutes equal in number the number of articles it is desired to collate, feed and deliver at each operation of the mechanism, and in the illustration shown in the drawings there are ten of said chutes so that the articles will be finally discharged from the mechanism in groups of ten.

Said frame-work 2 is provided at its sides with suitably located transversely alined opposite bearing portions 7 in which is journaled a transverse shaft 8, which extends beneath the open bottom of said hopper body 3, but above the receiving chutes 5. Fixed on said shaft 8 is an agitator element or kicker drum comprising a cylindrical member 9 having outwardly projecting kicker flanges 10 and 10'. Said kicker flanges 10 project outwardly from one side of said cylindrical member 9, while the kicker flanges 10' project outwardly from the opposite side of said cylinder member 9. Preferably said groups of kicker flanges 10 and 10' are arranged so that the members of one group occupy a staggered relation (in their longitudinal spaced relation to said cylindrical member 9) with reference to the members of the other group. Said cylindrical member 9 is so positioned relative to the receiving chutes 5, that its surface is disposed close to the edges of the side walls of said chutes 5, whereby only articles properly disposed within said chutes may pass downwardly through the latter and beneath the said cylindrical member 9. The said kicker flanges 10 and 10' will pass through the intermediate spaces 6 between the chutes 5 when the agitator element or kicker drum is rotated. Inclining downwardly and forwardly from the rear wall of said hopper body 3, so as to project over the cylindrical member 9, is a guard plate 11 having slots 12 admitting the passage of said kicker flanges 10 and 10' when revolved by the rotation of said agitator element or kicker drum. Said agitator element or kicker drum is rotated by means of a driving sprocket 13 fixed on an outwardly projecting end of said shaft 8, or any other suitable means driven from a suitable power source. Said agitator element or kicker drum is rotated in the direction of the arrow $x$ (see Figure 4), so that the kicker flanges 10 and 10' will move upwardly through the intermediate spaces 6 between the chutes 5.

As illustrative of the use and operation of the mechanism we have chosen to show the same adapted to collate, feed and discharge in groups of a desired number (ten pieces as shown) a plurality of small pieces G, such, for example, as candy coated chewing gum tablets, candy pieces, cough drops and similar goods. In operation, the goods or articles of the kind described are dumped, in bulk, into the hopper 3. As the agitator element or kicker drum is rotated, the kicker flanges 10 and 10' cause an agitative movement of the mass of pieces G immediately above the open trough-like receiving chutes 5, which causes the said pieces to be deposited lengthwise within said chutes 5, and thereupon free to move, by gravity downwardly through said chutes. The above described agitation of the mass of pieces G maintains the receiving chutes 5 constantly replenished, so that the same will respectively continuously feed a train or line of said pieces downwardly toward the point of delivery or discharge.

The lower ends of said receiving chutes 5 terminate at a suitably located opening 14 provided in said platform 1. The reference character 15 indicates a plurality of delivery chutes, the upper ends of which extend upwardly through said platform opening 14, whereby said delivery chutes are respectively opposed to and alined with the lower ends of said receiving chutes 5, so that as the pieces G drop out of the said receiving chutes 5 the same are caused to enter the upper ends of said delivery chutes 15. In order to prevent accidental outward displacement of said pieces G from the receiving chutes 5, after said pieces pass beneath the agitator element or kicker drum, there is provided a cover piece or plate 16, suitably supported by brackets 17, which is adapted to extend across the open faces of said receiving chutes 5. Said cover piece or plate 16 is provided with slots 18 permitting the passage of said kicker flanges 10 and 10', as the latter are revolved by the rotation of said agitator element or kicker drum. In order to assist in turning the pieces G downwardly into the upper ends of said delivery chutes 15, as the same leaves said receiving chutes 5, there is provided a suitably located transverse guard bar 19. The upper ends of said delivery chutes 15 are secured in the above described relation to said platform 1 and said receiving chutes 5, by means of a bracket-plate 20 to which the same are secured, and which is in turn secured to the underside of said platform 1. Said delivery chutes 15 are obliquely disposed to extend or incline downwardly and forwardly to a discharge means. Said discharge means comprises a foot piece 21 having a plurality of pockets 22 corresponding in number to the number of chutes, and the lower ends of said chutes 15 are connected with said foot-piece 21 so as to be respectively alined with the pockets 22 thereof. Said foot-piece 21 is supported between and fixed to a pair of transversely spaced apart side-frame plates 23, which are in turn secured to a supporting block 24 mounted upon the standard 25, or otherwise supported in such manner as would prove convenient with relation to other mechanism, such, for example, as a carton filling machine, with which the feeding and collating mechanism is desired to be associated. Connected with said foot piece 21 is a receiving plate 26, which projects forwardly beyond the outer ends of said pockets 22, to provide a shelf upon which the discharged and delivered articles may be arranged in the desired collated group.

Associated with said discharge chutes 15 is an automatic stop and release mechanism, which operates to aline the pieces G transversely in the several chutes, and the operation of which so controls the movement of said pieces, that the lowermost piece in each chute is simultaneously released for movement into the pockets 22 of the foot-piece 21, while the remaining pieces in the chutes are temporarily held against downward movement therethrough, thus assuring at each operation, the delivery of a single piece G from each chute 15, so that a group comprising the desired number of articles or pieces is discharged intermittently from the mechanism. This stop and release mechanism consists of a transverse rock-shaft 27 which is journaled in forwardly projecting bearing portions 28 provided at the upper ends of said side-frame plates 23, whereby said rock-shaft is disposed to extend in front of and across the open faces of said chutes 15 above the lower ends of the latter. Fixed on said rock-shaft 27 is a carrier block 29 having a downwardly projecting portion 30 at the lower end of which are a plurality of inwardly projecting stop fingers 31, corresponding in number to the number of chutes 15. The upwardly projecting portion 33 of said carrier block 29 is provided with a series of slideways or openings 32, which are positioned so that they are respectively opposed to each chute 15. The reference character 34 indicates yieldable clamp members having shanks 35 extending forwardly so as to be slidably disposed, respectively, in the said slideways 32. The outer free ends of said shanks 35 project outwardly from the outer face of said carrier block 29, and are provided with stop collars 36 held in place by cotter-pins 37, or otherwise secured to said shanks. Coil springs 38 are arranged around said shanks between said clamp-members 34 and the inner face of said carrier block 29, and the same serve to project outwardly said clamp-members 34 from the inner face of said carrier block 29. Secured upon one of the outer ends of said rock-shaft 27 is a crank-arm 39, to the lower end of which is pivotally connected a connecting-rod 40. The reference character 41 indicates a cam-shaft upon which is fixed a stop and release control cam 42. Said connecting-rod 40 is provided with a bifurcated end 43 riding on and guided by said cam-shaft 41, and said connecting rod having a pin or roller 44, which rides on and is engaged by said cam 42, whereby said connecting rod is reciprocated. A pull spring 45 is attached to said connecting rod, the same serving to hold said pin or roller in proper relation to said cam so as to assure the proper operation of said connecting-rod. Said connecting rod and its actuating mechanism serves to intermittently operate said stop and release mechanism, but it will be understood that other forms of actuating means may be employed to operate said stop and release mechanism if desired. In order to determine the normal initial position of said stop and release mechanism, there may be provided a transverse stop rod 46 extending between said side-frame plates 23, against which said portion 30 of said carrier block 29 is normally brought to rest, in which position the stop-fingers 31 are entered in said chutes 15 to engage and obstruct the downward passage of the pieces G therethrough. The rotation of the cam 42 causes a forward movement of said connecting rod 40 whereby said rock-shaft is oscillated through the medium of the crank-arm 39. The movement of said rock-shaft in one direction causes the lower portion of said carrier block 29 to swing outwardly, thereby withdrawing said stop-fingers 31 from the chutes 15, thus freeing the lowermost pieces G within said chutes for continued downward movement so that the same may drop into said pockets 22 of the foot-piece 21. Simultaneously with the outward movement of the stop-fingers 31, the upper portions of the carrier block 29 swing inwardly thereby carrying said clamp-members 34 into engagement with the pieces G immediately above the lowermost pieces which are to be released. The spring pressed clamp-members 34 exert a pressure upon the pieces G engaged thereby so as to hold the same and the pieces above the same against downward movement through the chutes 15 while the lowermost pieces are being released. After the above described operations, a continued rotation of the cam 42 carries the same back to normal initial position, so that the stop and release mechanism is returned to normal position, whereby the clamp member engaged pieces G are freed to drop down to stopped position against the stop-fingers 31, and the pieces G above likewise feed downwardly a step, as will be understood. It will thus be apparent that the mechanism automatically counts out, releases and feeds down at each operation a group of articles such as the pieces G, the number in the group being determined by the number of chutes employed. It will also be clear that the said operations are automatically accomplished, and that the release and delivery of the pieces may be timed to properly synchronize with any other mechanism with which the collating and feeding mechanism is desired to be employed. In order to prevent displacement of the pieces G from the chutes 15, there is provided a guard plate 47, which is suitably supported to extend transversely across the open faces of said chutes.

Ordinarily it is desirable that the pieces G be discharged from said pockets 22 of the foot-piece 21 in such a manner that the same are alined side by side in a symmetrical group upon the shelf or receiving plate 26, subject to such other operations as may be desired to be carried out, and to this end the following mechanism is provided. Disposed in the under side of said supporting block 24 are a pair of longitudinally extending guideways 48, associated with which are suitable gib-plates 49. Slidably movable in said guideways 48, and retained therein by said gib-plates 49, are a pair of slide members 50 to which may be imparted a reciprocatory movement. Connected with the forward end of each slide member 50 is an outwardly projecting transverse extension 50', at the outer termination of which is a rearwardly projecting perforate ear 51. Journaled in and extending between said sideframe plates 23 is a transverse rock-shaft 52, which extends above said supporting block 24. Fixed upon the respective ends of said rock-shaft 52 are depending lever arms 53, the lower extremities of which are pivotally connected, through links 54, with the perforate ears 51 of said respective slide members 50. Connected with the forward ends of said slide members 50 so as to extend transversely thereof, and so as to be supported thereby in back of said foot-piece 21, is a cross bar 55 to which are secured a plurality of forwardly extending ejector plungers 56. The said ejector plungers 56 correspond in number with the number of pockets 22 of said foot-piece 21, and the same are alined with said pockets 22 so as to extend through the rear wall of said foot-piece 21 into said pockets 22. After the pieces G have been released from the delivery chutes so as to drop into the pockets 22, as above described, a forward sliding movement is imparted to said slide members 50 which carries forward said cross bar 55 with the ejector plungers 56, so that the latter move outwardly through said pockets thereby pushing the pieces G out on to the shelf 26 in a properly alined group thereupon. The means for reciprocating said slide members 50, to carry out the above described operations, comprises a connecting rod 57 which is pivotally connected with one of said lever arms 53 intermediate its upper and lower ends. Said connecting rod 57 is provided at its rearward extremity with a bifurcated portion 58 which rides on and is guided by said cam shaft 41, and said connecting rod 57 is further provided with a pin or roller 59 which is operatively engaged by an ejector plunger cam 60 which is fixed on and rotated by said cam-shaft 41, whereby the connecting-rod 57 is reciprocated to produce the desired timed operation of said ejector plunger mechanism. A pull spring 61 is attached to said connecting-rod 57, the same serving to hold said pin or roller 59 in proper relation to said cam 60, so as to assure the proper operation of said connecting-rod 57. It will be understood that if desired other means than those just described may be employed to actuate said ejector plunger mechanism.

Having thus described the present invention, we claim:—

1. In a device of the kind described, a hopper, a rotary agitator element in the bottom of said hopper, a plurality of chutes having their receiving ends inclining downwardly across the open bottom of said hopper and extending beneath said agitator element, release means associated with the discharge portions of said chutes adapted to simultaneously release one article at a time from each chute, means to receive the articles released from said chutes, and means for simultaneously ejecting said articles from said receiving means to deposit the same in an alined or collocated group.

2. In a device of the kind described, a plurality of chutes each adapted to receive a train of articles movable therethrough by gravity, a hopper mounted above the upper receiving portions of said chutes, a rotary agitator element mounted intermediate the bottom of said hopper interior and said receiving portions of said chutes, said agitator element having kicker flanges projecting from its circumference and movable through spaces between said receiving portions of said chutes, and release means associated with the discharge portions of said chutes adapted to simultaneously release one article at a time from each chute.

3. In a device of the kind described, a plurality of chutes each adapted to receive a train of articles movable therethrough by gravity, a hopper mounted above the upper receiving portions of said chutes, a rotary agitator element mounted intermediate the bottom of said hopper interior and said receiving portions of said chutes, said agitator element having kicker flanges projecting from its circumference and movable through spaces between said receiving portions of said chutes, release means associated with the discharge portions of said chutes adapted to simultaneously release one article at a time from each chute, means to receive the articles released from said chutes, and means for simultaneously ejecting said articles from said receiving means to deposit the same in an alined or collocated group.

4. In a device of the kind described, a plurality of chutes each adapted to receive a train of articles movable therethrough by gravity, means for supplying articles to said chutes, release means associated with the discharge portions of said chutes adapted to simultaneously release one article at a time from each chute, said release means comprising an oscillatable carrier block, means for pivotally mounting said carrier block for extension across the faces of said chutes, said carrier block having at its lower end inwardly projecting stop-fingers normally entered in said chutes, yieldable clamp devices at the upper end of said carrier block adapted to engage and hold back the remaining articles in said chutes upon outward movement of said stop-fingers tending to release the lowermost articles from said chutes, and means for actuating said release means.

5. In a device of the kind described, a plurality of chutes each adapted to receive a train of articles movable therethrough by gravity, means for supplying articles to said chutes, release means associated with the discharge portions of said chutes adapted to simultaneously release one article at a time from each chute, said release means comprising an oscillatable carrier block, means for pivotally mounting said carrier block for extension across the faces of said chutes, said carrier block having at its lower end inwardly projecting stop-fingers normally entered in said chutes, yieldable clamp devices at the upper end of said carrier block adapted to engage and hold back the remaining articles in said chutes upon outward movement of said stop-fingers tending to release the lowermost articles from said chutes, means for actuating said release means, means to receive the articles released from said chutes, and means for simultaneously ejecting said articles from said receiving means to deposit the same in an alined or collocated group.

6. In a device of the kind described, a plurality of chutes each adapted to receive a train of articles movable therethrough by gravity, means for supplying articles to said chutes, release means associated with the discharge portions of said chutes adapted to simultaneously release one article at a time from each chute, said release means comprising an oscillatable carrier block, means for pivotally mounting said carrier block for extension across the faces of said chutes, said carrier block having at its lower end inwardly projecting stop-fingers normally entered in said chutes, yieldable clamp devices at the upper end of said carrier block adapted to engage and hold back the remaining articles in said chutes upon outward movement of said stop-fingers tending to release the lowermost articles from said chutes, means for actuating said release means, a foot-piece having pockets alined with the discharge ends of said chutes, ejector plungers movable through each pocket, a reciprocable slide means upon which said plungers are mounted, means for supporting said slide means, and means for actuating said slide means and said plungers to eject articles from said pockets to form an alined collocated group thereof.

7. In a device of the kind described, a plurality of chutes each adapted to receive a train of articles movable therethrough by gravity, a hopper mounted above the upper receiving portions of said chutes, a rotary agitator element mounted intermediate the bottom of said hopper interior and said receiving portions of said chutes, said agitator element having kicker flanges projecting from its circumference and movable through spaces between said receiving portions of said chutes, release means associated with the discharge portions of said chutes adapted to simultaneously release one article at a time from each chute, said release means comprising an oscillatable carrier block, means for pivotally mounting said carrier block for extension across the faces of said chutes, said carrier block having at its lower end inwardly projecting stop-fingers normally entered in said chutes, yieldable clamp devices at the upper end of said carrier block adapted to engage and hold back the remaining articles in said chutes upon outward movement of said stop-fingers tending to release the lowermost articles from said chutes, and means for actuating said release means.

8. In a device of the kind described, a plurality of chutes each adapted to receive a train of articles movable therethrough by gravity, a hopper mounted above the upper receiving portions of said chutes, a rotary agitator element mounted intermediate the bottom of said hopper interior and said receiving portions of said chutes, said agitator element having kicker flanges projecting from its circumference and movable through spaces between said receiving portions of said chutes, release means associated with the discharge portions of said chutes adapted to simultaneously release one article at a time from each chute, said release means comprising an oscillatable carrier block, means for pivotally mounting said carrier block for extension across the faces of said chutes, said carrier block having at its lower end inwardly projecting stop-fingers normally entered in said chutes, yieldable clamp devices at the upper end of said carrier block adapted to engage and hold back the remaining articles in said chutes upon outward movement of said stop-fingers tending to release the lowermost articles from said chutes, means for actuating said release means, means to receive the articles released from said chutes, and means for simultaneously ejecting said articles from said receiving means to deposit the same in an alined or collocated group.

9. In a device of the kind described, a plurality of chutes each adapted to receive a train of articles movable therethrough by gravity, a hopper mounted above the upper receiving portions of said chutes, a rotary agitator element mounted intermediate the bottom of said hopper interior and said receiving portions of said chutes, said agitator element having kicker flanges projecting from its circumference and movable through spaces between said receiving portions of said chutes, release means associated with the discharge portions of said chutes adapted to simultaneously release one article at a time from each chute, said release means comprising an oscillatable carrier block, means for pivotally mounting said carrier block for extension across the faces of said chutes, said carrier block having at its lower end inwardly projecting stop-fingers normally entered in said chutes, yieldable clamp devices at the upper end of said carrier block adapted to engage and hold back the remaining articles in said chutes upon outward movement of said stop-fingers tending to release the lowermost articles from said chutes, means for actuating said release means, a foot-piece having pockets alined with the discharge ends of said chutes, ejector plungers movable through each pocket, a reciprocable slide means upon which said plungers are mounted, means for supporting said slide means, and means for actuating said slide means and said plungers to eject articles from said pockets to form an alined collocated group thereof.

10. In a device of the kind described, a plurality of chutes each adapted to receive a train of articles movable therethrough by gravity, a hopper mounted above the upper receiving portions of said chutes, a rotary agitator element mounted intermediate the bottom of said hopper interior and said receiving portions of said chutes, and said agitator element having kicker flanges projecting from its circumference and movable through spaces between said receiving portions of said chutes.

In testimony, that we claim the invention set forth above we have hereunto set our hands this 23rd day of March, 1921.

HARRY L. EVANS.
JESSE WATSON ANDREWS.

Witnesses:
JOHN T. DELANO, Jr.,
ROLIN C. EBBS.